United States Patent [19]

Legerius et al.

[11] Patent Number: 4,480,717
[45] Date of Patent: Nov. 6, 1984

[54] PREFABRICATED LUBRICANT UNIT

[75] Inventors: Bengt E. Legerius, Nyköping; Hans W. Siebert, Oxelösund, both of Sweden

[73] Assignee: Telefonaktiebolaget L M Ericsson, Stockholm, Sweden

[21] Appl. No.: 448,898

[22] PCT Filed: Apr. 23, 1982

[86] PCT No.: PCT/SE82/00134
§ 371 Date: Dec. 6, 1982
§ 102(e) Date: Dec. 6, 1982

[87] PCT Pub. No.: WO82/03665
PCT Pub. Date: Oct. 28, 1982

[30] Foreign Application Priority Data

Apr. 24, 1981 [SE] Sweden .................. 8102629

[51] Int. Cl.³ .................. F16C 33/10; F16C 43/02
[52] U.S. Cl. .................. 184/14; 184/5
[58] Field of Search .................. 184/1 R, 5, 14.1, 15.1, 184/100, 18, 39, 109

[56] References Cited

U.S. PATENT DOCUMENTS

| 2,523,358 | 9/1950 | Conner | 184/5 X |
| 3,273,668 | 9/1966 | Abel | 184/109 |
| 4,174,767 | 11/1979 | Kramer | 184/39 X |
| 4,275,096 | 6/1981 | Taylor | 184/18 X |

Primary Examiner—David H. Brown
Attorney, Agent, or Firm—Roberts, Spiecens & Cohen

[57] ABSTRACT

A lubricant unit intended for application between the contact surfaces of two bodies for reducing friction between the bodies during displacement of the bodies relative each other especially in the case where one or both of the bodies comprises a porous material. The lubricant unit in its unapplied condition comprises at least one film with mutually opposed film surfaces and a lubricant deposited between these surfaces. After placing the unit between the bodies whose friction is to be reduced, the contact surface of at least one body is covered by film, whereby the necessary force for overcoming friction between the bodies will depend solely on the friction between a film surface coated with lubricant and a contact surface, or on the friction between two lubricant-coated film surfaces.

2 Claims, 6 Drawing Figures

Fig. 4
Fig. 5
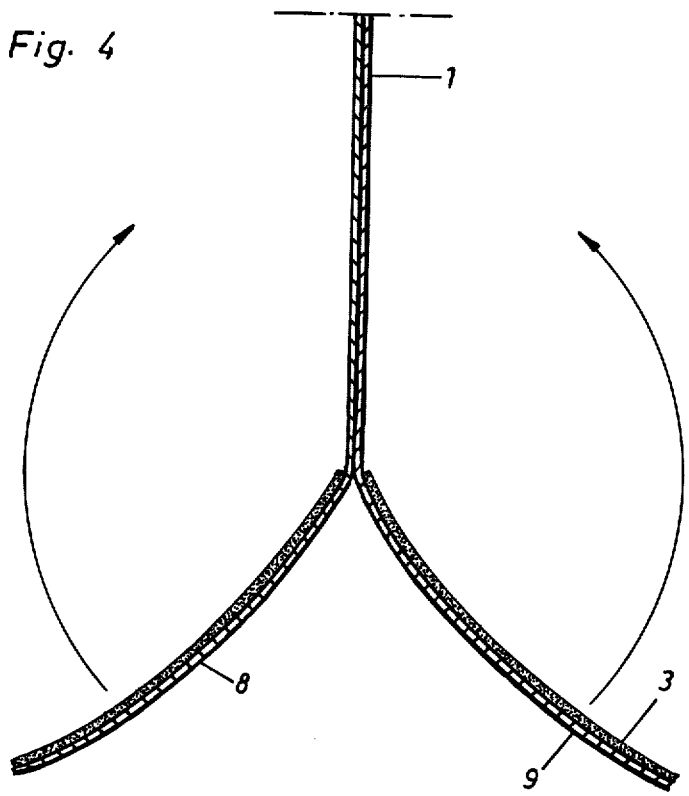
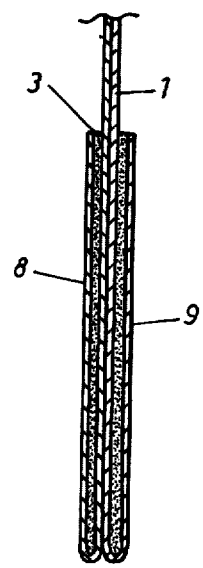

PREFABRICATED LUBRICANT UNIT

FIELD OF THE INVENTION

The present invention relates to a lubricant unit to be applied between the contact surfaces of two bodies, for reducing the friction between them when they are displaced relative each other, especially in the case where one or both bodies comprise porous material.

BACKGROUND ART

In the mutual displacement of bodies it is conventional to apply between them a friction-reducing agent such as oil, grease, soap or the like. A disadvantage with this technique is that the lubricant has a tendency to spread to such places where it is not supposed to be, while also as handling often becomes messy. When the operation which requires the lubricant has been executed, an extra cleaning operation is generally required, in which a solvent of some kind must often be used, and workmen's safety directions relating to air changes etc. must be observed. If one or both bodies is of porous material there is the additional drawback that the lubricant is absorbed by the porous material.

SUMMARY OF THE INVENTION

The object of the present invention is to provide a prefabricated lubricant unit which may be placed between bodies for their displacement relative each other, and which in appropriate cases, when it has served its purpose, can be removed without leaving any traces. There is thus eliminated messy work operations, while a guaranteed good lubricating effect is achieved.

The lubricant unit in accordance with the invention is characterized in that it includes in its unapplied condition at least one film arranged with mutually facing film surfaces and with a lubricant deposited between these surfaces. The contact surface of at least one of the bodies is covered by film after placing the lubricant unit between the bodies in question, and the force required for overcoming friction between the bodies will be dependent only on the friction between a film surface coated with lubricant and one contact surface or between two film surfaces coated with lubricant.

An advantageous application of the invention constitutes a lubricant unit for reducing the friction when inserting a hard body in a hole in an elastic material, where the hole has substantially less dimensions than those of the body. In such a case the hard body can constitute a sleeve used for laying cable through a fire-sealing lead-through filled with elastic material, the hole with the substantially lesser dimensions in this case being one for a cable made in the elastic material of the fire seal, said material usually constituting a silicon foamed rubber.

Preferred embodiments of the invention for precisely this purpose will be described in detail in the following while referring to the appended drawings.

DESCRIPTION OF FIGURES OF THE DRAWING

FIG. 3 illustrates the same sleeve with the lubricant stocking as in FIG. 2, but after insertion in the lead-through.

FIG. 4 illustrates a lubricant stocking in cross section, with a slit outer hose, during a stage of manufacture.

FIG. 5 illustrates the same lubricant stocking ready for use.

DETAILED DESCRIPTION OF PREFERRED EMBODIMENTS

Figure 1:
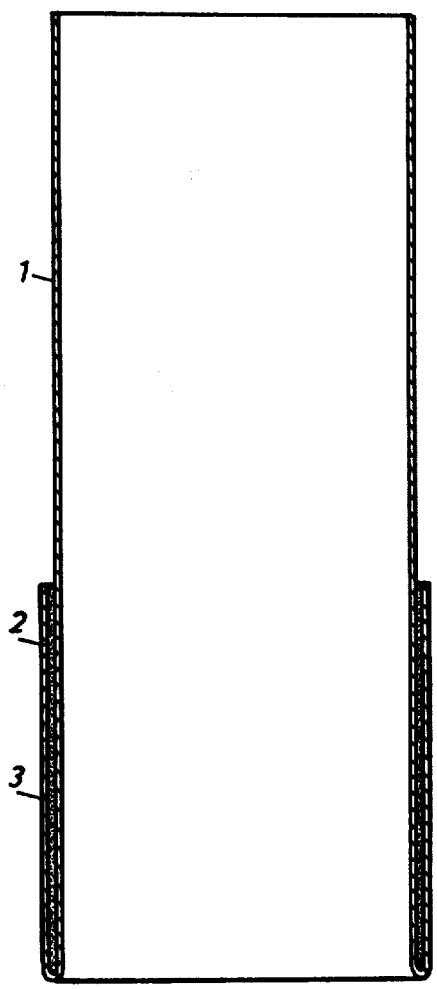
FIG. 1 illustrates in cross section a lubricant unit in the form of a hose or stocking.

In FIG. 1 is shown a cross section of a lubricant unit in the form of a hose or stocking, in which a tube of plastic film has a portion pulled over itself at one end, to form an inner tube 1 and an outer tube 2, partially overlapping the inner tube 1. A lubricant layer 3 has been uniformly applied between the inner and outer tubes.

Figure 2:
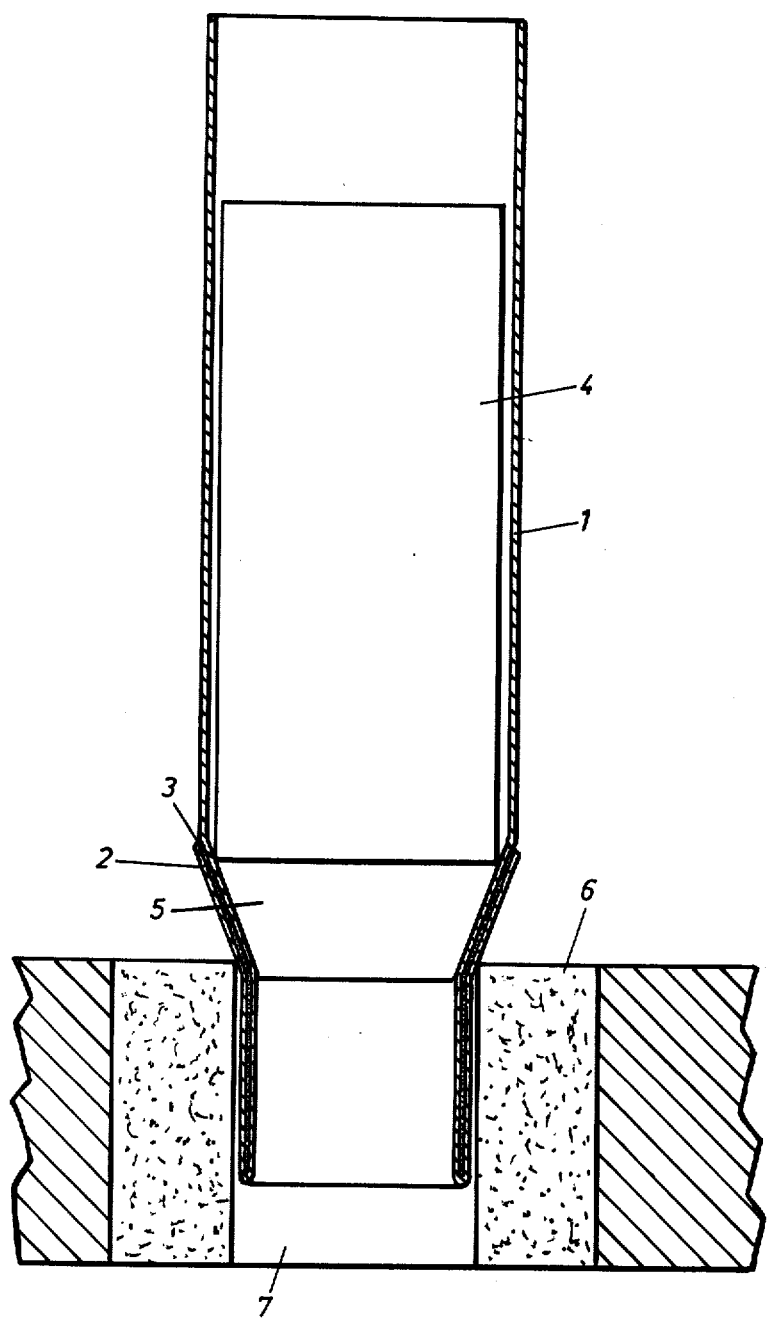
FIG. 2 illustrates a sleeve with a lubricant stocking placed over it before insertion in a fire-sealed lead-through, the lubricant stocking and lead-through being illustrated in cross section.

In FIG. 2 there is illustrated a sleeve 4, and in section there is shown a lubricant stocking pulled over the sleeve and comprising inner tube 1, outer tube 2, and lubricant layer 3 between tubes 1 and 2. The sleeve, which has a conical end portion 5, is illustrated in position for insertion in a hole 7, made in elastic material 6 filling a lead-through, also shown in cross section. The stocking has been pulled over the sleeve just sufficiently for the outer tube 2 to cover the conical portion of the sleeve.

Figure 3:
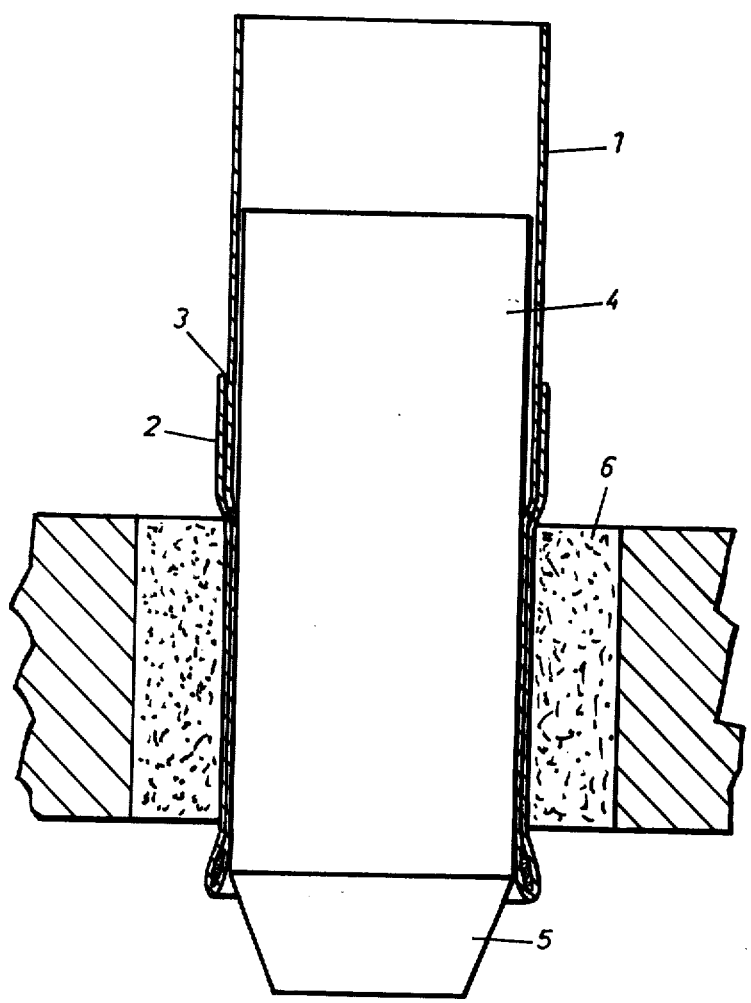

FIG. 3 illustrates the sleeve in FIG. 2 inserted into the lead-through. The relatively large friction between the inner tube 1 of the lubricant stocking and the sleeve 4 as well as between the outer tube 2 and the elastic material 6, has resulted in the inner tube 1 being adhered to the sleeve 4 and the outer tube 2 being adhered to the elastic material 6 when the sleeve was inserted. The sleeve has thus glided into the lead-through on the surfaces of the lubricant stocking, facing each other and coated with lubricant, a further portion of the inner tube having been pulled inside out to become part of the outer tube. When the sleeve is pulled out from the hole after cable laying has been completed, the stocking is pulled back into its original shape.

FIG. 4 illustrates a lubricant stocking in cross section, with a slit outer tube, during a stage in manufacture. If the outer tube is slit along its entire length at two mutually opposing positions, the tube can be flattened in manufacture, the two outer tube halves 8 and 9 can be coated with lubricant, whereupon these can be folded towards the inner tube in a manner illustrated by the Figure. The appearance of the final product is seen in FIG. 5, which illustrates a cross section of a lubricant stocking manufactured in this manner.

Figure 6:
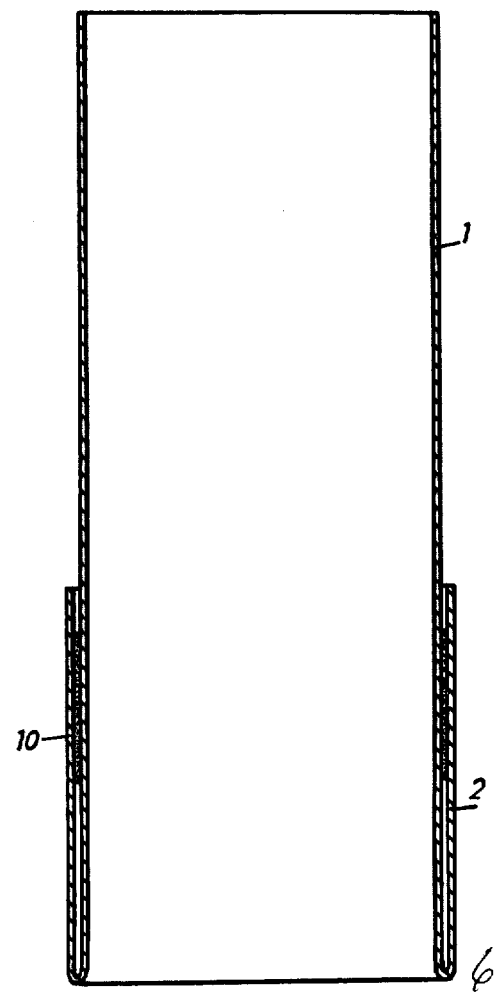
FIG. 6 illustrates a lubricant stocking in cross section, with a lubricant pad inserted between the film layers, in the form of an intermediate layer impregnated with lubricant.

FIG. 6 illustrates a lubricant stocking in cross section, with a lubricant pad 10 in the form of an intermediate layer impregnated with lubricant inserted between the inner tube 1 and outer tube 2. The layer may comprise blotting paper, thin cellular plastic or the like, which has been allowed to absorb the necessary amount of lubricant. The pad is placed between the outer and inner tubes so that it is completely circumferential. This method substantially simplifies lubricant dosage and manufacture, while ensuring uniform lubricant distribution, When a lubricant stocking with a lubricant pad is used for inserting a sleeve in a fire-sealing lead-through in the manner illustrated in FIGS. 2 and 3, there will be first a compression of the lubricant pad, resulting in lubricant being pressed out into the space between the outer and inner tubes. During continued insertion, the inner tube will then glide against the pad and further lubricant will be distributed in the space between the outer and inner tubes.

What is claimed is:

1. A lubricant unit intended for application between the contact surfaces of two bodies for reducing friction between them during displacement of the bodies relative each other especially in the case where one or both of the bodies comprises a porous material, said lubricant unit in an unapplied condition comprising at least one film (1,2) arranged with mutually opposing film surfaces, and a lubricant (3) deposited between these surfaces, such that after placing said unit between the bodies (4,6) to reduce the friction therebetween, the contact surface of at least one body is covered by film, whereby the necessary force for overcoming friction between the bodies will depend solely on the friction between a film surface coated with lubricant and a contact surface, or on the friction between two lubricant-coated film surfaces.

2. A lubricant unit as claimed in claim 1, wherein the lubricant is absorbed by a layer (10) of an absorbing material placed between the film surfaces facing each other, said layer releasing lubricant to the film surfaces when it is subjected to pressure.

* * * * *